United States Patent
Kling et al.

(10) Patent No.: US 7,155,445 B1
(45) Date of Patent: Dec. 26, 2006

(54) SYSTEM AND METHOD FOR SELF-RECOVERING REAL-TIME DATA-FEED COMPRESSION AND ARCHIVING

(75) Inventors: Brian Kling, Piscataway, NJ (US); Joyce Zhong, Bridgewater, NJ (US)

(73) Assignee: Cingular Wireless II, LLC, Atlanta, GA (US)

( * ) Notice: Subject to any disclaimer, the term of this patent is extended or adjusted under 35 U.S.C. 154(b) by 497 days.

(21) Appl. No.: 10/771,327

(22) Filed: Feb. 5, 2004
(Under 37 CFR 1.47)

(51) Int. Cl.
*G06F 17/00* (2006.01)
*G06F 7/00* (2006.01)

(52) U.S. Cl. .................. 707/101; 707/204; 707/205

(58) Field of Classification Search .............. 707/1–3, 707/101, 102, 104.1, 200, 202–205; 709/203, 709/212, 219, 225, 206, 248; 711/4, 111, 711/162, 170
See application file for complete search history.

(56) References Cited

U.S. PATENT DOCUMENTS

| | | | | |
|---|---|---|---|---|
| 5,113,512 A | * | 5/1992 | Miki et al. | 711/206 |
| 5,237,675 A | * | 8/1993 | Hannon, Jr. | 710/68 |
| 5,455,947 A | | 10/1995 | Suzuki et al. | |
| 5,463,772 A | * | 10/1995 | Thompson et al. | 707/101 |
| 5,485,606 A | * | 1/1996 | Midgdey et al. | 707/10 |
| 5,530,850 A | | 6/1996 | Ford et al. | |
| 5,537,588 A | * | 7/1996 | Engelmann et al. | 707/202 |
| 5,623,701 A | * | 4/1997 | Bakke et al. | 710/68 |
| 5,649,158 A | * | 7/1997 | Lahr et al. | 711/161 |
| 5,774,715 A | * | 6/1998 | Madany et al. | 707/101 |
| 5,832,518 A | | 11/1998 | Mastors | |
| 6,108,759 A | * | 8/2000 | Orcutt et al. | 711/173 |
| 6,192,365 B1 | | 2/2001 | Draper et al. | |
| 6,532,121 B1 | * | 3/2003 | Rust et al. | 360/8 |
| 6,757,698 B1 | * | 6/2004 | McBride et al. | 707/204 |
| 6,799,206 B1 | * | 9/2004 | Workman et al. | 709/223 |
| 6,804,689 B1 | * | 10/2004 | Havrda et al. | 707/204 |

FOREIGN PATENT DOCUMENTS

WO      WO 97/04391      2/1997

OTHER PUBLICATIONS

Shlomit S. Pinter et al.:Profile-driven Compression Scheme For Embedded System, May 2006, ACM, pp. 95-103.*

* cited by examiner

*Primary Examiner*—Greta Robinson
*Assistant Examiner*—Jacques Veillard
(74) *Attorney, Agent, or Firm*—Paul, Hastings, Janofsky & Walker LLP

(57) ABSTRACT

A system and method for real-time compression and archiving of data files is disclosed. Some data files become so large that archiving onto a single storage medium, such as a CD-ROM or floppy disk, becomes difficult. In order to allow for such archival storage, an initial data file is broken down into smaller data files for compression. Once compressed, successive files are selected for storage onto a first storage medium until the storage medium becomes full. Once the first storage medium is full, the next set of data files is selected and placed onto a second storage medium. This process is repeated until all of the smaller files that originated from the initial file are archived.

19 Claims, 4 Drawing Sheets

SYSTEM AND METHOD FOR SELF-RECOVERING REAL-TIME DATA-FEED COMPRESSION AND ARCHIVING

BACKGROUND OF THE INVENTION

1. Field of the Invention

The present invention relates to the field of data storage, and more particularly, to a method and system for compressing and archiving a real-time data-feed in a manner which most efficiently utilizes storage space.

2. Description of the Related Art

The management and storage of log files, files that list actions that have occurred, is imperative in the information age. Log files are used in many different areas. In the telecommunications industry, log files are used to record call activity for each subscriber. In e-commerce, log files are maintained by web servers that list every request made to the server to keep track of where visitors are coming from, how often they return, and how they navigate through a site. This information is necessary for many purposes, including billing, consumer profiling, and marketing.

As one may imagine, these log files are becoming increasingly larger, especially log files detailing daily call activity in a telecommunications network. If these files become too large, they will exceed the size of the storage medium on which they are to be archived. While the file in these instances may be split in half, with each half stored on a separate storage medium, this process is not the most efficient method concerning the space of the storage medium, for each half may leave room on the storage medium that could be used to store other files.

Another problem with current archiving procedures involves the response to system faults. Currently, if there is a fault, crash, or other disruption in the activity of the system, the archiving process is interrupted. To resume the archiving process, typically a human user must evaluate the progress of the archiving before the system fault, and must take actions to resume the archiving process. This task may involve manually zipping data files, if the system was "in the middle" of zipping data files, which may take hours or even days of tedious work by a human user to complete.

Therefore, there is a need in the art for archiving files in such a manner as to maximize the space of the storage medium storing the files. There is also a need in the art for a method and system for archiving data files onto a storage medium when the data file is larger than the size of the storage medium. Furthermore, there is a need in the art for providing a self-recovering mechanism in such a file archiving system to continue the archiving process after a system fault without substantial human interaction.

SUMMARY OF THE INVENTION

The present invention overcomes the aforementioned drawbacks in the prior art by archiving log files in such a manner as to maximize the storage space of the storage medium, while providing a self recovering mechanism to resume the archiving process in the event of a system fault.

After a data file is received, the data file is divided into one or more divisional parts. These divisional parts are compressed into corresponding zipped files. Each resulting zip file is added to a group whose size corresponds to that of the size of the storage medium. If the next zipped file would cause the group to be larger than the size of the storage medium, that zipped file is placed into a new group. The completed group of zipped files is then stored onto the storage medium.

The present invention also incorporates a self-recovering mechanism in the archiving process. A place locator is continuously updated that is indicative of the progress of the archiving process. In the event of a system fault, the system references the place locator to enable the system to resume the archiving process with little to no required human interaction.

These and other features of the present invention and their attendant advantages will be more fully appreciated upon a reading of the following detailed description in conjunction with the associated drawings.

DETAILED DESCRIPTION OF THE INVENTION

Figure 1:
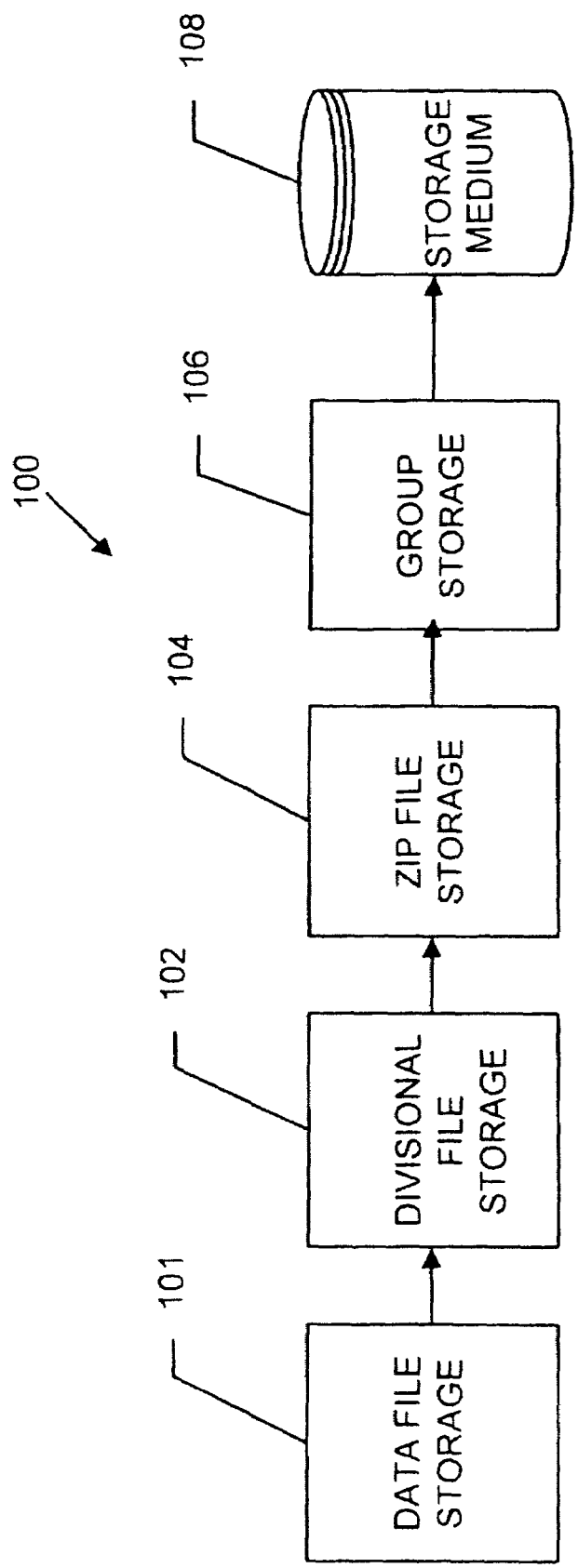
FIG. 1 is a block diagram illustrating an exemplary system according to an embodiment of the present invention.

FIG. 1 is a block diagram illustrating an exemplary system 100 in accordance with the present invention. Data file storage 101 stores data files before they are partitioned into divisional parts. After the data files are partitioned, the system stores these files in divisional file storage 102. The divisional files stored in divisional file storage 102 are then compressed and stored in zip file storage 104. System 100 then forms groups of compressed divisional files. The size of the groups is preferably equal or substantially equal to the size of a storage medium 108. Groups are stored in group file storage 106. These file storages can be separate disks, subdirectories on disk, or some other way of delineating electronic storage areas.

System 100 further comprises storage medium 108. Storage medium 108 may be any kind of storage, including but not limited to, floppy disks, optical disks, hard drives, and magnetic tape. The groups of compressed divisional files stored in group storage 106 are transferred to the storage medium 108. Files in group file storage 106 which will not fill the storage medium 108 can be left alone until more files are added to it to complete the set; or they can be moved to storage without filling it.

Figure 2:
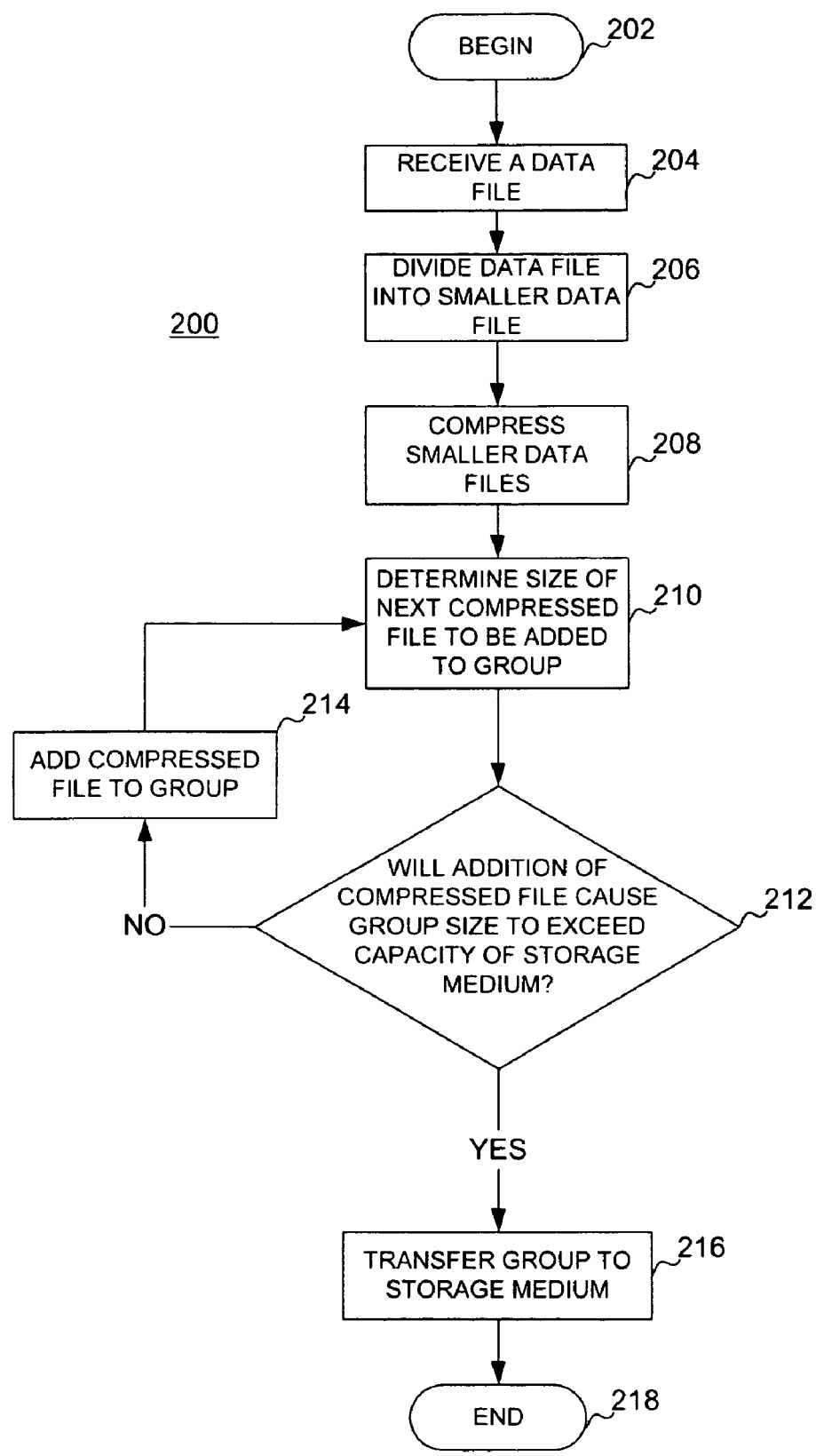
FIG. 2 is a flow diagram illustrating an exemplary series of steps in accordance with a method of the present invention.

FIG. 2 is a flow diagram illustrating an exemplary method according to the present invention. Method 200 begins at step 202 and proceeds to the receipt of a data file at step 204. At step 206, the data file is divided into divisional files. The divisional files may represent any sort of time interval, including but not limited to, a division by minute, hour, day, week, month, year, a number or combination of any of the aforementioned time intervals, or they could be divided by a fixed number of equal-sized records.

At step 208, the divisional files are compressed into zip files or some other type of compressed file. Next, at step 210, the system checks the size of a zip file to be added to see if the addition will cause the group size to go over the limit. If the group size is not greater than the size of the storage medium, the file is added to the group at step 214 and the method loops back to step 210 to check the next file. If the system determines at step 212, however, that the group size would be greater than the size of the storage medium the file is not added. If the group size would be greater than the size of the storage medium, method 200 proceeds to step 216 and the recently filled group is transferred to the storage medium, whereupon, at step 218, the process ends as to that particular storage medium. Method 200 may then be repeated for a new storage medium until all compressed files have been archived.

Figure 3:
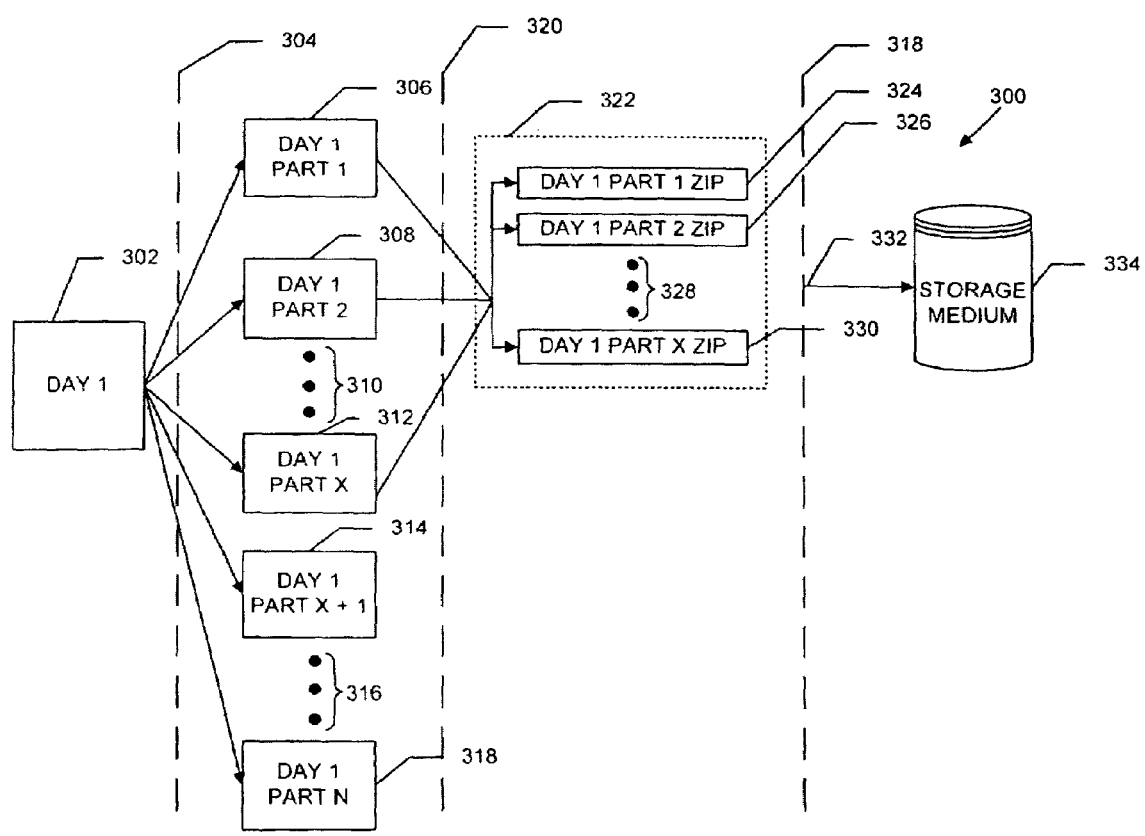
FIG. 3 is a block diagram illustrating the archival of data files in accordance with an embodiment of the present invention.

FIG. 3 is a block diagram illustrating the archival of data files in accordance with the present invention. Perforated lines 304, 320, and 318 represent different stages of the data file archival process. System 300 comprises original data file 302 which, for purposes of illustration, corresponds to an entire day. While data file 302 represents an entire day in FIG. 3, those skilled in the art will understand that data file 302 may in fact correspond to any time interval appropriate or necessary for a system operating in accordance with the methodology of the present invention, including but not limited to, a minute, hour, day, week, month, year, or a number of any of the aforementioned time intervals.

After time interval 304, data file 302 is then divided into N number of parts, represented by 306, 308, 310, 312, 314, 316, and 318. N represents a specific number of divisions of each data file, which may include, but is not limited to, a division by minute, hour, day, week, month, year, or a number or combination of any of the aforementioned time intervals. Ellipses 310 represents divisional parts 3 through X−1 of Day 1 302. Likewise, ellipses 316 represents divisional parts X+1 though N of Day 1 302.

At time interval 320, divisional parts 306–318 are compressed into zip files, after which, the divisional parts 306–318 are deleted. After each divisional part is compressed into a zip file, the compressed file is copied into group 322 and then deleted. Group 322 comprises sufficient divisional parts to equal the size of storage medium 334. If group 322 is not exactly equal to the size of storage medium 334, then group 322 is less than, but not greater than, the size of storage medium 334. In FIG. 3, Day 1 divisional parts 1–X, represented by blocks 306, 308, omitted divisional parts 310, and block 312, constitute a size slightly less than the size of storage medium 334, wherein the addition of Day 1 part X+1 to group 322 would render group 322 larger than storage medium 334. Omitted divisional parts 310 represent one or more divisional parts X−2 in between divisional part Day 1 Part 2 (308) and divisional part Day 1 Part X (312).

At time interval 318, group 322 is transferred via communication link 332 to storage medium 334. Storage medium 334 may be any kind of storage, including but not limited to CD-ROM, DVD-R, floppy disk, RAM, EPROM, or EEPROM memory, and may be either volatile or non-volatile memory. Communication link 332 may be either bi-directional or uni-directional, and also may be either a wired or wireless connection.

An example of the file storage described above is shown below.

EXAMPLE 1

Step 1

| Day Directories | | Temporary Interval Directories |
|---|---|---|
| \01_15_2002\*.log | move | \temphold_01152002\0000\*.log |
| \01_16_2002\*.log | → | \temphold_01152002\0100\*.log |
| \01_16_2002\*.log | | \temphold_01152002\0200\*.log |
| . | | . |
| . | | . |
| . | | . |
| \mm_dd_yyyy\*.log | | \temphold_mmddyyyy\hhmm\*.log |

EXAMPLE 1-continued

Step 2

| Temporary Interval Directories | | Compressed Files |
|---|---|---|
| \temphold_01152002\0000\*.log | zip→ | 011520020000.zip |
| temphold_01152002\0100\*.log | zip→ | 011520020100.zip |
| \temphold_01152002\0200\*.log | zip→ | 011520020200.zip |
| temphold_mmddyyyy\hhmm\*.log | zip→ | mmddyyyyhhmm.zip |

Step 3

| Compressed Files | | Archive Directory |
|---|---|---|
| 011520020000.zip | | |
| 011520020100.zip | move→ | \011520020000_011620021000\*.zip |
| . | | |
| . | | |
| . | | |
| 011620021000.zip | | |
| 011620021100.zip | | |
| 011620021200.zip | move→ | \011620021100_011720022300\*.zip |
| . | | |
| . | | |
| . | | |
| 011720022300.zip | | |

Figure 4:
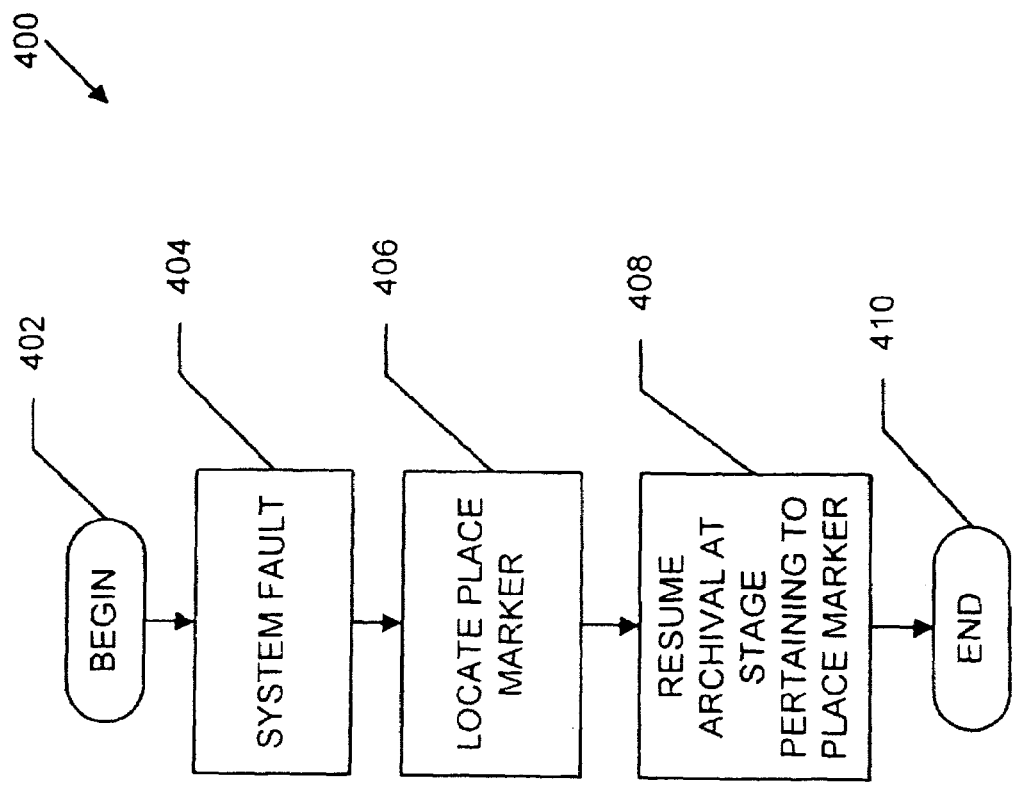
FIG. 4 is a diagram illustrating an exemplary self-recovering method according to an embodiment of the present invention.

FIG. 4 is a diagram illustrating the self-recovering aspect of the present invention. Method 400 begins at step 402 and proceeds to the occurrence of a system fault at step 404. A system fault can be any event causing disruption of a computer system, including but not limited to, a power outage, system crash, or any other sort of system disruption.

At step 406, the system locates the place marker indicating the stage the system was in the data file archival process before the system fault. The place marker indicates the stage in the data file archiving process the system was in before the system faulted. The place marker may be, for example, a counter that may be updated to numerically represent a position in the process of the present invention. The place marker may also be the files themselves. For example, if the system stopped while zipping files, it will see that interval 304 is complete because stage 101 is empty. It will then go on to 102 and find files there. It starts zipping the remaining files regardless of the fact that some of the files were already zipped, since they are no longer in 102. If the system fails during 304, while dividing files, it will see that there are still files left in 101 and continue dividing them. As files are divided, they are deleted so they can't be divided again. If the system fails during 320, while grouping files, it will see that there are no files in 101 or 102, but will see files in 104 and continue moving them into groups 106. The system may be designed to only try to group files into the most recently created group, and if it's full, it creates a new group. At step 408, the system then resumes the data archival process at the stage indicated by the place marker. Method 400 ends at step 410.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

The invention claimed is:

1. A method of archiving data files onto a storage medium having a fixed storage capacity, comprising:
   receiving a data file;
   dividing said data file into a plurality of divisional files;
   separately compressing each of the plurality of divisional files to obtain compressed files;
   sequentially adding successive compressed files to a directory;
   checking a size of the directory each time a new compressed file is to be added to ensure that adding the new compressed file does not exceed the storage capacity of the fixed medium;
   if adding the new compressed file does not cause a group size to exceed the storage capacity of the fixed medium, adding the new compressed file to the directory; and
   if adding the new file would cause the group size to exceed the storage capacity of the fixed medium, transferring the compressed files from the directory to the storage medium.

2. The method of claim 1, wherein receiving a data file comprises receiving a log file.

3. The method of claim 1, wherein said dividing said data file into one or more divisional files comprises dividing said data file into one or more divisional files based on time intervals.

4. The method of claim 3, wherein compressing the one or more divisional files comprises zipping the one or more divisional files.

5. The method of claim 1, wherein said transferring said group to the storage medium comprises transferring said group to the storage medium via a wired communications link.

6. The method of claim 1, wherein said transferring said group to the storage medium comprises transferring said group to the storage medium via a wireless communications link.

7. The method of claim 1, wherein the adding, deleting, and transferring are repeated until all of the plurality of compressed files have been stored.

8. The method of claim 1, further comprising updating a place marker indicative of a last successful archiving step.

9. The method of claim 8, further comprising detecting a system fault and accessing the place marker.

10. The method of claim 9, further comprising resuming archiving at a stage indicated by the place marker.

11. The method of claim 1, wherein the storage medium comprises a floppy disk.

12. The method of claim 1, wherein the storage medium comprises a hard disk.

13. The method of claim 1, wherein the storage medium comprises a magnetic tape.

14. The method of claim 1, wherein the storage medium comprises an optical disk.

15. A system of archiving data files onto a storage medium, said system comprising:
   a storage medium;
   a processing unit;
   a program module operable on said processing unit, said program module containing instructions operative to:
     receive a data file;
     divide said data file into one or more divisional files;
     compress said one or more divisional files;
     sequentially add successive compressed files to a directory;
     check a size of the directory each time a new compressed file is to be added to ensure that adding the new compressed file does not exceed the capacity of the storage medium;
     collect one or more compressed files into a group approximately the size of but not exceeding the size of the storage medium; and
     transfer said group to the storage medium.

16. The system of claim 15, wherein said storage medium comprises a floppy disk.

17. The system of claim 15, wherein said storage medium comprises a hard disk.

18. The system of claim 15, wherein said storage medium comprises magnetic tape.

19. The system of claim 15, wherein the storage medium comprises an optical disk.

* * * * *